United States Patent [19]

McKenney

[11] 4,243,871
[45] Jan. 6, 1981

[54] FLUID HEATING SYSTEM WITH STORAGE OF ELECTRIC HEAT

[75] Inventor: James L. McKenney, Norwell, Mass.
[73] Assignee: Vapor Corporation, Chicago, Ill.
[21] Appl. No.: 866,554
[22] Filed: Jan. 3, 1978
[51] Int. Cl.³ .................. H05B 1/02; G05D 23/13; F24H 7/04
[52] U.S. Cl. .................. 219/326; 165/18; 165/35; 165/40; 165/104 S; 165/107 R; 219/341; 219/365; 219/378; 237/8 C
[58] Field of Search .............. 219/281, 259, 367, 369, 219/326, 325, 341, 378, 365; 165/32–36, 96, 100, 101, 108, 18, 1, 39, 40, 104–107, 103, 154; 237/8 C

[56] References Cited

U.S. PATENT DOCUMENTS

| | | | |
|---|---|---|---|
| 1,382,569 | 6/1921 | Tait | 165/34 |
| 2,461,774 | 2/1949 | Robertson | 219/378 X |
| 2,911,513 | 11/1959 | MacCracken | 219/326 |
| 2,951,687 | 9/1960 | Schulenberg et al. | 165/108 |
| 3,298,431 | 1/1967 | Weaver | 165/105 |
| 3,382,917 | 5/1968 | Rice | 219/325 X |
| 3,411,571 | 11/1968 | Lawrence | 165/107 |
| 3,422,248 | 1/1969 | Beaulieu et al. | 237/19 |
| 3,630,275 | 12/1971 | Beaulieu et al. | 165/154 |
| 3,888,303 | 6/1975 | Skala | 219/326 X |

FOREIGN PATENT DOCUMENTS

| | | | |
|---|---|---|---|
| 2258755 | 6/1974 | Fed. Rep. of Germany | 219/326 |
| 2402497 | 7/1975 | Fed. Rep. of Germany | 219/326 |
| 1322119 | 2/1963 | France | 219/325 |
| 1474860 | 2/1967 | France | 219/325 |

Primary Examiner—A. Bartis
Attorney, Agent, or Firm—Francis J. Lidd

[57] ABSTRACT

A heating system includes a heat storage tank containing a heat transfer fluid (water) electrically heated to a high temperature. A tube/shell heat exchanger having a pair of fluid flow paths arranged in counter flow relationship is provided for extraction of heat from storage tank by the circulation of the heat transfer fluid therethrough. Conduit means connect the outlet of the tank to the inlet of the first flow path. The outlet of the first flow path is connected to the inlet of a temperature responsive diverter valve having a pair of outlets. A first diverter valve outlet is connected to the inlet of the tank and the second diverter valve outlet is connected to the inlet of the first flow path. A pump responsive to the temperature at the outlet of the first flow path causes the heat transfer fluid to be circulated when the temperature at the outlet drops. The pump and diverter valve are so arranged that flow of heat transfer fluid is established through the first flow path and the second outlet of the diverter valve, thereby bypassing the heat storage tank, prior to establishment of the flow of heat transfer fluid through the first flow path, first diverter valve outlet and the tank, to thus allow utilization of stored heat without flashing of the liquid to be heated flowing through the second flow path of the heat exchanger.

16 Claims, 3 Drawing Figures

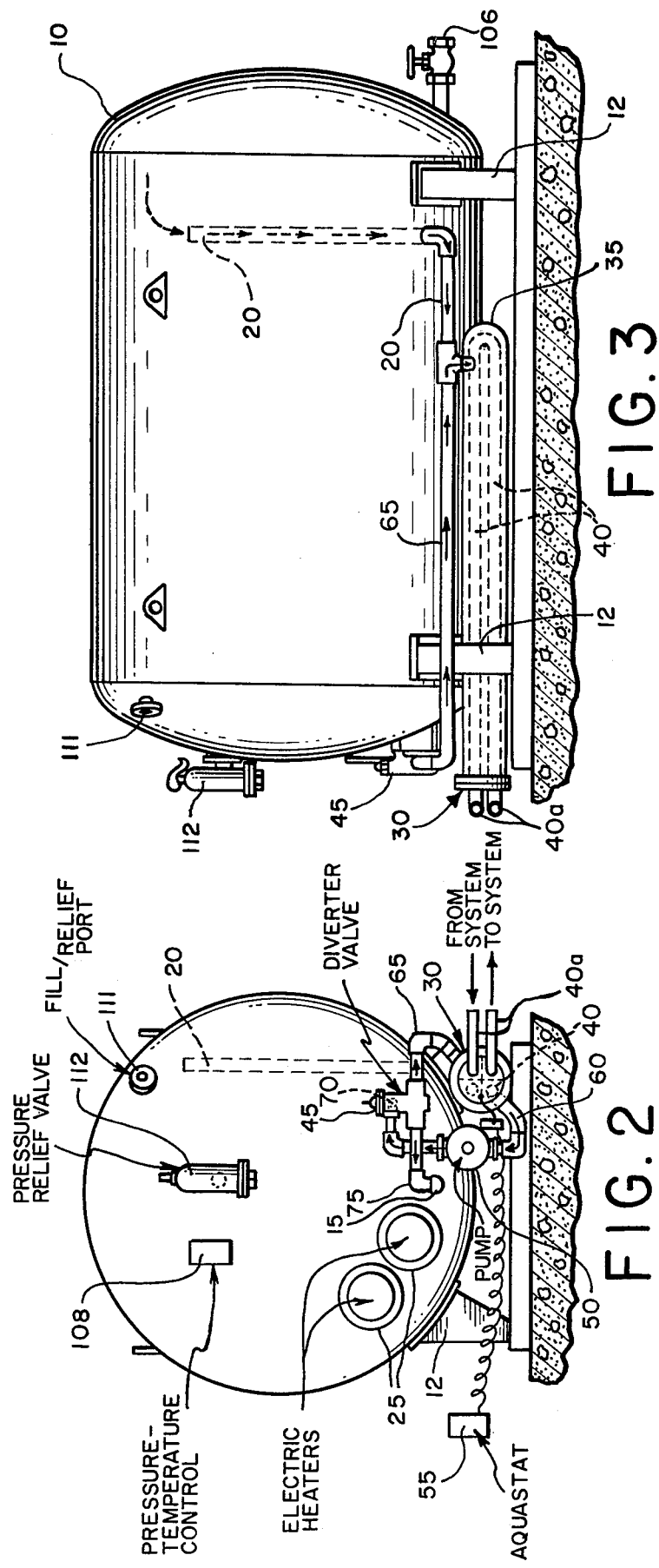

FLUID HEATING SYSTEM WITH STORAGE OF ELECTRIC HEAT

BACKGROUND OF THE INVENTION

This invention relates to liquid heat systems and in particular to those employing thermal storage at temperatures substantially above that of the heated system. It is well known that heating equipment utilizing thermal storage is highly desirable in that an infrequent or a periodic heat source can be utilized in addition to providing a means to defer or reduce peaks on energy supplied by utility systems.

Examples of a periodic heat which is made usable through a storage system include waste heat from incinerators, prime movers, and heat pump outputs.

Systems of this type are disclosed in the following U.S. Pat. Nos. 3,422,248, 3,630,275, 3,298,432, 3,411,571, 2,911,513, and 2,461,774. The above systems; in particular, the U.S. Pat. Nos. 3,298,431 and 3,411,571 employ thermal storage at substantially higher temperatures than the systems which are supplied with the stored thermal energy. Use of a high temperature storage is highly advantageous as it reduces the physical size of the storage unit, and provides a large temperature difference which improves heat transfer and response to demands for heat. Most heated systems providing a thermal load utilize liquids, such as water, which undergo phase changes through boiling at temperatures near those required to satisfy system needs. The resultant pressure increases due to vaporization produced by boiling of heated system liquids, in addition to being dangerous, result in unsteady flow of the liquid, substantial mechanical forces on the system and noise due to pressure pulsations in the heated system. Approaches disclosed in the above patents employ elaborate, expensive, and in many cases unreliable techniques in transferring heat.

The major technical problem involved in heating volatile liquids from high thermal potentials or temperatures is well known in the art as thermal "matching". In order to accomplish heat transfer without phase change it is necessary either to provide increased surface area or flow rates, or to employ other methods which effectively adjust the hydro-dynamic films between the liquid and heated surfaces to provide proper thermal gradiant for preventing the highly undesirable boiling. It is also necessary to accomplish this in a thermally efficient manner by varying the heat transfer conditions with load, since ordinary cooling of the films would result in substantial heat losses.

A practical solution to this problem has been provided by the systems disclosed in the above U.S. Pat. No.s. 3,422,248, and 3,630,275 patents in which the applicant was a co-inventor and are hereby incorporated by reference to this application. The schemes disclosed in these patents are "off-peak" stored energy heating systems which utilize a proprietary condensing system which essentially "matches" the energy contained in the higher temperature storage with that required in the heated water system. However, a characteristic of the system disclosed requires that an initial heat demand results in a certain amount, although controlled, of liquid flashing into vapor within the storage tank heat exchanger. An additional difficulty encountered in prior art systems involves pressure differential between thermal storage and heat utilizing systems. For example, in a water heating system employing heat storage at 280° F. (137.5° C.) in order to provide 160° F. delivered hot water, heated or system water, the "system" pressure cannot be reduced below saturation values for water at its highest temperature at any point in the system. Due to variation in film coefficients in various parts of the heat exchange system, it is necessary to maintain a substantially higher pressure than that corresponding to saturation at the load side or delivered water temperature if flashing is to be avoided. However, in many applications, it is necessary to operate the heated water system at a relatively high static pressure. In these situations the methods for controlling "flashing" disclosed in U.S. Pat. Nos. 3,422,248, and 3,630,275, are unsatisfactory, due to the high costs incurred in manufacturing condensing equipment which will operate satisfactorily at the higher pressures. Heretofore, although high pressure heat exchangers were economically attractive and available, the flashing or thermal matching problem precluded their use. However, application of the novel concepts of the invention allows use of conventional heat exchangers over a wide range of liquid temperatures and pressures without flashing or phase change.

Generally speaking, therefore, the attendant difficulties resulting from utilizing high temperature storage to supply heat for medium or low temperature systems, at reasonable cost and providing necessary reliability is still a substantial problem in the industry. As indicated above, the present state of the art has produced only partial solutions to the problem.

OBJECTS OF THE INVENTION

It is, therefore, the object of this invention to provide a liquid heater employing high temperature heat storage and matching thermal loads to stored heat over a wide range of heat requirements and heat storage temperatures.

It is a further object of this invention to provide a liquid heater having heat storage and providing modulation of the thermal output and/or temperature of the heated liquid over a wide range of heat output requirements.

It is a still further object of this invention to provide a liquid heater employing heat energy storage that is highly responsive to load changes in the heated system.

It is a still further object of this invention to provide a liquid heater employing thermal storage wherein the pressures of the fluid storage medium are isolated and not affected by the operating pressure of the heated system.

An additional object of this invention is to provide a thermal storage liquid heater wherein heat exchange between the heat storage and heat demand systems is controlled to eliminate flashing of the heated liquid when heat is withdrawn from storage.

An additional object of this invention is to provide a unit which cools an external or load system by supplying heat from that system to a thermal storage mass operating at a substantially lower temperature without phase change in the external system.

SUMMARY OF THE INVENTION

A heating system is provided which utilizes thermal storage and provides closely controlled or modulated output over a wide range of loads. The unit disclosed in a preferred embodiment employs water in a closed circulation loop consisting of a heat exchanger shell, a heated storage tank, a circulating pump, and a temperature sensitive diverting or mixing valve. Although water is used, those skilled in the art will recognize that many other methods of storage could be employed including compounds which liquify at pre-set temperatures and are solid at others. Use of storage media which undergoes a phase change or fusion would of course require auxiliary heat transfer components to equalize liquid and solid state areas and transfer rates. In the disclosed embodiment, a conventional aquastat is utilized to maintain the storage temperature at a preset value.

In operation, the storage tank containing water is heated, preferably by electric immersion heaters, to a value of approximately 280° F. Changes in the supplied or heated system liquid temperature are detected as a temperature change by the aquastat sensing bulb which is located in the heat exchanger shell at its outlet side. Under these conditions should the temperature fall, the aquastat initiates pump operation providing heat communicating flow of the load cooled storage water through the temperature sensing diverter valve which adjusts the flow proportions to match the heat loss. Flow of high temperature stored water and recirculated water, remix and enter the exchanger shell at a temperature required to maintain system load conditions.

It will be appreciated by those skilled in the art that the location of the aquastat and the utilization of counter flow between shell and the tubes of the heat exchanger allows the heat exchanger to supply initial thermal demand from the water contained in the shell while at the same time supplying long term demand by actuating the temperature sensitive valve to increase the proportion of flow from the high temperature storage resulting in a highly responsive system. It will also be appreciated by those skilled in the art that the establishment of flow through the heat exchanger and heat storage prior to any change in state or temperature of either the stored liquid or heated liquid provides a novel method for extracting heat from the higher temperature liquid heat storage, thus a novel "thermal matching" concept is disclosed.

On a reduction in system load, the rise in system water temperature is sensed, somewhat delayed, relative to the rapid change in tube temperature, since the higher temperature water first enters the heat exchanger shell at a location remote from that of the aquastat temperature sensor. Therefore, under these conditions, pump operation is prolonged, providing retention of the established flow conditions, i.e., tube/shell thermal coupling and thermal communications with heat storage until a proper position of the mixing valve is established, resulting in a closed loop circulation pattern between periods of heat withdrawal which utilizes minimum energy from the high temperatures storage. This results in minimizing flashing and greatly reduced losses from the storage since the external heat exchanger pump and attendant piping due to the retention of high conductivity, film coefficient, operates at or very near the minimum or preset temperatures of the mixing valve and aquastat.

BRIEF DESCRIPTION OF THE DRAWINGS

Other objects and advantages of the invention will become apparent upon reading the following descriptions and upon reference to the drawings in which;

FIG. 2 is a pictorial view of the preferred embodiment of the heater as viewed from one end showing typical locations of the major components, including the heat storage tank, circulating pump, tube/shell heat exchange, diverter valve and associated piping.

FIG. 3 is an additional view of the heater of FIG. 1 as viewed from one side.

DETAILED DESCRIPTION OF THE INVENTION

Figure 1:
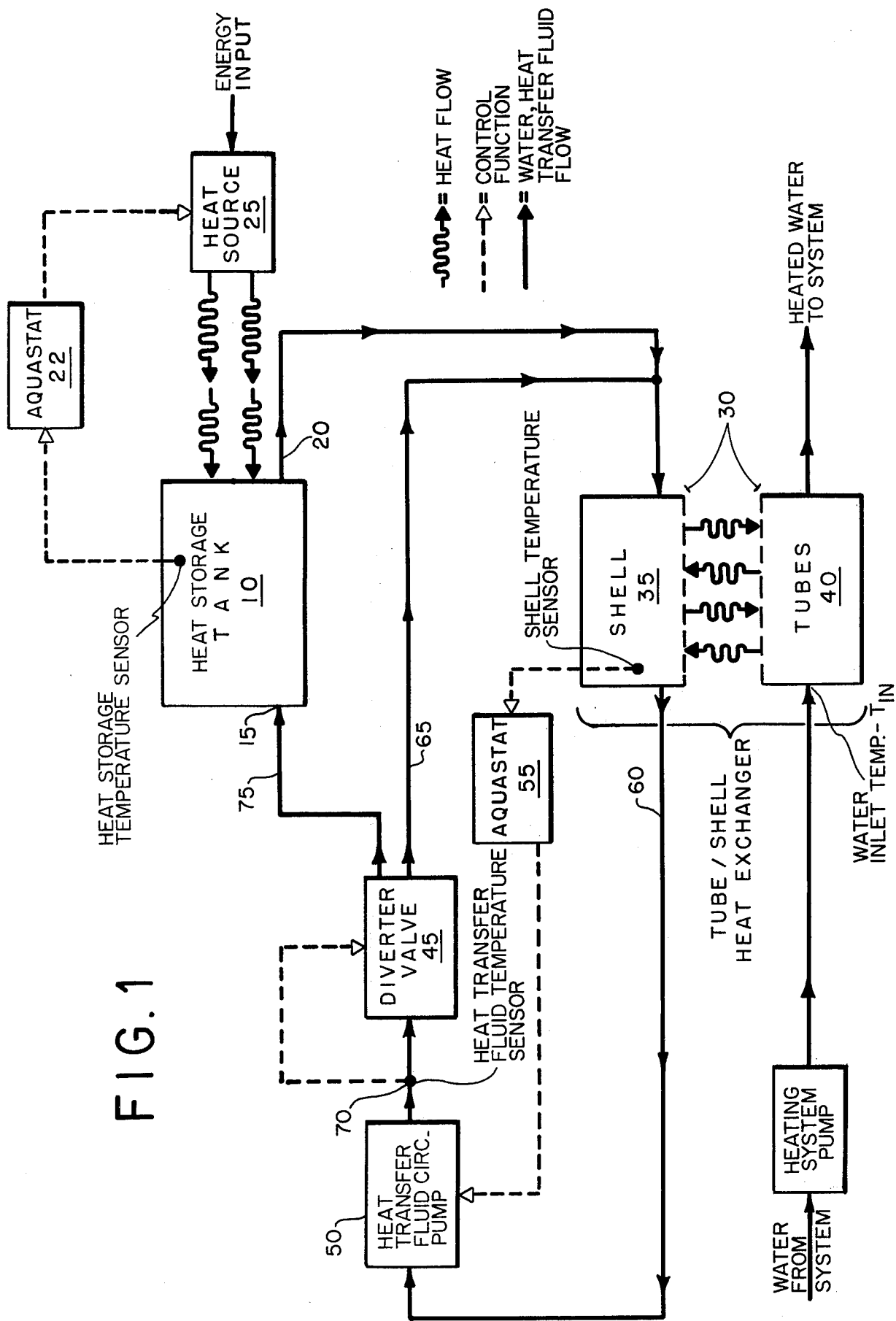
FIG. 1 is a somewhat schematic diagram showing interconnection of major components along with fluid and energy flows.

While the invention will be described in connection with the preferred embodiment utilizing water as the storage means and, generally speaking, utilizing water as the transfer medium in the system to be heated, it will be understood that this preferred embodiment does not limit the invention to that embodiment. On the contrary, a water system is disclosed since the applicant has most experience with water systems and generally speaking feels that a best disclosure will be made available in this way. However, this disclosure is intended to cover all alternatives, modifications and equivalence as may be included within the spirit and scope of the invention which will be defined by the hereafter appended claims.

As best indicated in FIG. 1, returning system water at temperature T in, is circulated through the tube side 40 of the tube/shell heat exchanger 30. This flow, as indicated, transfers heat through the heat transfer path from the shell side 35. The shell side flow of the exchanger is circulated through the loop consisting of the exchanger shell 35, the storage circulating pump 50 and the diverter valve 45. It should be noted that the shell loop contains that portion of the liquid which the diverter valve apportions for recirculation based on the shell exit temperature. An additional loop containing the remainder of the flow from the diverter valve 45 consists of the shell 35, circulating pump 50, diverter valve 45, and the heat storage container 10.

The storage container or tank 10 utilizes conventional pressure and temperature control and relief equipment plus service accessories, not a part of the invention, but included to complete the disclosure. These include, a pressure relief valve 112 and tank pressure/temperature control 108, a tank fill valve 106, and fill relief port 111. It will be appreciated by those skilled in the art that many other approaches to controlling pressure and temperature in a storage tank are possible.

In operation, depending on the shell exit temperature, the diverter valve 45 apportions flow either through the storage tank 10 and then to the shell 35 or directly from the valve to the shell side. Aquastat 55 senses the temperature T shell at the heat exchanger shell exit as indicated above and initiates operation of the storage circulating pump (50) when the shell temperature falls below a predesignated value. The temperature of the storage liquid contained in the tank 10 is maintained at a pre-set temperature by the aquastat 22 which senses temperature of the storage medium contained in the tank, and adds additional heat as needed from heat source 25. In the preferred embodiment, electric energy is utilized, however, other souces of heat would be suitable.

In operation, the system heat requirements are detected by the aquastat 55 due to a drop in temperature of the system water returning to the tube side 40 of the heat exchanger 30. Initially, the required heat is furnished by the volume of fluid contained in the shell side 35 of the exchanger. However, as this is limited, a sizable demand for heat will reduce the shell temperature and aquastat 55 will initiate the operation of circulating pump 50. At this point, as will be discussed later, the diverter valve 45 is essentially adjusted for low or nearly zero flow through the storage tank. Therefore, pump operation will be initiated prior to operation of the temperature sensitive diverter valve, since the pumped liquid at reduced temperature is required to adjust the heat extraction from the storage tank to the demand value. This initial or "lead" pump operation is extremely important in establishing flow conditions through both the storage tank, and, in particular, establishing heat transfer films of sufficient magnitude around the tubes 40 of the heat exchanger. This flow and film establishment provides the essential heat transfer mechanism which allows successful heat transfer from the high temperature fluid contained in thermal storage to the relatively low temperature heated system without allowing the intermediate fluid films to reach saturation temperature. As indicated above, entering the saturation region results in undesirable flashing of the lower temperature fluid.

Time response of the heat exchanger outlets to changes in inlet and/or heating system temperatures is also of importance in minimizing transient flashing during periods of heat extraction from the storage tank.

As indicated above, it is necessary to initiate pump operation early in the heat withdrawal cycle and prolong and pump operating period when heat demand is reduced in order to properly control fluid flow from the storage tank. Initiating heat withdrawal through high temperature flow from storage with zero flow through the exchanger shell presents the greatest potential for flashing. Under these conditions, high temperature stored fluid enters the heat exchanger before steady state heat exchanger is established, resulting in local boiling or flashing of the heated liquid. This condition, as indicated earlier, can be damaging to heating equipment. Therefore, rapid temperature response of the shell or heat exchanger contained liquid to a tube side reduction in temperature is necessary to insure adequate shell side flow prior to admitting appreciable amounts of high temperature liquid from storage.

Alternately, in the case of a tube side temperature rise or reduction in thermal load, a delay in shell side response is desirable. The above is achieved by the piping configuration as disclosed, wherein two time responses are encountered, that is response of the aquastat to a change in shell temperature prior to pump operation, and a somewhat longer delay or reduced response to shell temperature changes on shut down while the pump or circulating means is running.

Additional assistance in establishing the proper heat transfer mechanism during a period of load reduction is provided by the counter-flow connection of the tube/shell heat exchanger.

As those skilled in the art will appreciate, counter-flow provides a relatively constant temperature difference between the heating fluid, whether the storage media or an intermediate circulating fluid, and heated liquids, measured along the length of the heat exchange surfaces. Therefore, from inlet to outlet of both heating fluid and heated liquid, a relatively constant temperature difference occurs. When fluid flow and heat transfer are established, among others, three shell side fluid temperatures can be distinguished. These are (Ref. FIGS. 2 and 3) the heating fluid temperature at the inlet to the heat exchanger, roughly associated with outlet 20 of tank 10, a heating fluid temperature adjacent to an "average" tube in the tube/shell heat exchanger 30, and the heating fluid heat exchanger outlet temperature roughly associated with pipe 60. These temperatures are designated as first, second, and third fluid temperatures respectively. When a reduction in the heating load occurs, the temperature of system return flow designated begins to increase thereby reducing the heat transfer between the tubes 40 and shell 35 and ultimately increasing the shell temperature. At this time, the operation of the circulating pump 50 and the setting of the diverter valve 45 are such that excessive heat is being extracted from the tank 10. As the diverter valve is sensitive to liquid temperature in its loop, the temperature rise due to load reduction will result in fast valve action to reduce the amount of liquid circulated through the high temperature storage tank 10. However, the aquastat sensor location in shell 35 is such that shell temperature will continue pump operation for an additional period of time insuring that the diverter valve 45 reaches a position of minimum flow through the storage, a situation highly desirable from the standpoint of reducing storage losses. Additionally, the minimum flow position through storage is important in readying the system for a subsequent heating cycle.

Returning now to FIGS. 2 and 3, showing front and side views of a preferred embodiment of the invention. The major components numbers correspond to those in FIG. 1 discussed above. FIG. 2 is the front view of a configuration embodying the invention of this disclosure utilizing a tank 10 containing water typically heated to 320° F. (160° C.) mounted on a suitable base 12 and having an outlet 20 internal to the tank and located at a point substantially above the tank center line. A tank inlet 15 is located near the lower surface of the tank. The relative locations of the inlet outlet are important in order to most properly utilize the heat contained in the stored liquid as will be described later. Heat sources 25 consisting of electrical immersion heaters in this embodiment, but those skilled in the art will readily see could be other sources of heat such as a heat exchanger tube or steam condensor. These heat sources are strategically located near the bottom center line of the tank in order to improve the heat transfer efficiency to the heat storage liquid contained in the tank. A tube and shell exchanger generally designated as 30 having a shell 35 and internal tube bundles 40 terminated in the fittings 40 is located alongside and parallel to the tank 10. Associated piping 75, 65, 60 and 70 connect the heat exchanger shell and the tank inlet and outlet with the circulating pump 50. Also contained in a loop as shown on FIG. 1 is the diverter valve 45. An aquastat 55 is located with its sensing element internal to the heat exchanger shell.

Operation essentially is as indicated above. Water flows are indicated by arrows generally located on piping connecting the system components.

The invention disclosed also contemplates a mode of operation wherein the heat storage is operated at temperatures substantially below the system operating temperatures. In this situation heat is withdrawn from the demand system to effect cooling. While temperature differences in cooling are substantially less than those of heating and saturation difficulties are absent, fusion or freezing of the cooled system liquid occurs and again heat exchange must be controlled. Therefore, the novel concepts of "thermal matching" contained in the invention of this application apply equally well to a cooling system.

Thus it is apparent that there has been provided, in accordance with the invention, a stored energy water heater that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for heating liquids and having heat storage at temperature substantially different from said liquid comprising;

storage means for storing heat;
means admitting heat to said storage means;
a fluid for transferring heat between said storage means and a liquid to be heated;
first heat exchange means thermally communicating said fluid with said storage means at a first fluid temperature;
second heat exchange means in thermal communication with said liquid at a second fluid temperature;
means thermally coupling said first and second heat exchange means at a third fluid temperature;
means activating said thermal coupling in response to said third fluid temperature; and
means controlling said fluid communication in response to said third fluid temperature;
said activating means and said controlling means being so constructed and arranged that, in sequence, said activating means establishes thermal coupling between said first and second heat exchange means prior to establishment of thermal communication between said storage means and fluid, thereby allowing utilization of stored heat without flashing of said liquid in said second heat exchange means.

2. Apparatus contained in claim 1 wherein said first heat exchange means, second heat exchange means, and means thermally coupling said first and second heat exchange means comprise a tube and shell heat exchanger.

3. The apparatus of claim 1 wherein said activating means is a fluid pump for circulating said heat transfer fluid through said first heat exchange means.

4. The apparatus of claim 1, wherein said controlling means is a temperature sensitive diverter valve controlling the flow of fluid to the heat storage means.

5. The apparatus of claim 1 wherein said heat storage means comprises a tank filled with water.

6. The apparatus of claim 1 wherein said heat admitting means comprises;
immersion electric heaters; and
electrical control means for switching current on and off to said immersion heaters.

7. Apparatus for heating liquids and having heat storage maintained at a temperature substantially different from said liquid, comprising;

a tank having an inlet and an outlet and containing thermal storage fluid;
a diverter valve having an inlet and first and second outlets;
means responsive to the temperature at said valve inlet for apportioning liquid flow between said outlets in accordance with said inlet temperature;
a fluid heat exchanger having first and second inlets and outlets, said first inlet and second outlet having a first thermal response time and said second inlet and first outlet having a second thermal response time less than said first response time to changes in inlet temperatures, respectively;
a circulating pump responsive to said first outlet fluid temperature;
a first loop comprising said pump, storage tank, diverter valve inlet and first outlet, heat exchanger first inlet and first outlet, for circulating storage fluid;
a second loop comprising said pump, diverter valve inlet and second outlet, and heat exchanger first inlet and first outlet for recirculating storage fluid;
a third liquid loop circulating system liquid through said second heat exchanger inlet and outlet;
said pump and diverter valve being so constructed and arranged that said pump responds to said first outlet temperature within said second response time to establish flow in said second loop prior to establishment of flow in said first loop by said diverter valve thereby matching the temperatures of said storage fluid and system liquid to satisfy heat requirements without flashing of the system liquid.

8. The system described in claim 7 wherein said heat exchanger is a shell and tube unit.

9. The system of claim 7 wherein said temperature responsive pump includes a circulating pump and an aquastat having a remote temperature sensing bulb arranged to sense the temperature at said first outlet.

10. In a system for heating system water and utilizing electrical energy to heat storage water maintained at a predetermined temperature in a heat storage tank substantially above that of the system water, the improvement comprising;

a first loop including a pump circulating heated storage water through the inlet and first outlet of a diverter valve, the heat storage tank and the shell side of a tube/shell exchanger;
a second loop including said pump for recirculating water through the inlet and second outlet of the diverter valve and the shell side of the tube/shell heat exchanger, said pump being responsive to said shell side outlet temperature, said diverter valve including means responsive to the diverter valve inlet temperature for apportioning water flow between said first and second diverter valve outlets in accordance with said diverter valve inlet temperature;
a third loop circulating system water including the tubes of said tube/shell heat exchanger;
said pump and diverter valve being so constructed and arranged that said pump responds to said shell side outlet temperature to establish flow and heat transfer in said second loop prior to establishment of flow and heat transfer in said first loop by said diverter valve, thereby allowing the withdrawal of heat from said heat storage water at a temperature above the saturation temperature of the system water without flashing of the system water.

11. A method for thermally matching a high temperature storage mass to the heated liquid of a system operated at a prescribed temperature substantially lower than the storage mass comprising the steps of;

storing heat in said mass;

circulating a predetermined quantity of an intermediate fluid through the first passage of a heat exchanger having two isolated flow passsages in thermal communication;

circulating a predetermined quantity of heated system liquid through said second heat exchanger passage;

circulating a portion of said intermediate fluid through said storage mass, for extracting heat therefrom;

circulating the remainder of said intermediate fluid through a storage mass bypass;

controlling the apportionment of said intermediate fluid circulation by a diverter valve, said valve responsive to the temperatures of said circulating fluid at its inlet, wherein said valve and intermediate fluid coact to restrict circulation through said storage mass;

initiating circulation in response to a drop in said first passage fluid temperature;

controlling said diverter valve so that in sequence, a drop in first passage temperature initiates circulation through said bypass, thereby establishing heat transfer in said exchanger between said fluid and liquid prior to establishing circulation through said storage mass, thereby providing transfer of heat from said storage mass to said liquid without flashing.

12. The method described in claim 11 wherein said storage mass comprises a tank filled with pressurized water.

13. The method described in claim 11 whereby said circulation is initiated through the use of a pump controlled by an aquastat.

14. A heating system comprising;

a heat storage tank containing a heat storage mass, said heat storage tank having a fluid inlet, a fluid outlet, and thermostatically controlled heat input means for maintaining the storage mass at a predetermined high temperature;

means for extracting heat from said heat storage mass by circulation of a heat transfer fluid therethrough, said heat extraction means comprising;

a heat exchanger, said heat exchanger having a first fluid flow path having an inlet and an outlet and a second fluid flow path having an inlet and an outlet, said first and second fluid flow paths being arranged on counterflow relationship;

conduit means connecting the outlet of said tank to the inlet of said first flow path;

conduit means connecting the outlet of said first flow path to the inlet of a diverter valve having a first fluid outlet and a second fluid outlet;

conduit means connecting the first outlet of said diverter valve to the inlet of said tank;

conduit means connecting the second outlet of the diverter valve to the inlet of said first flow path;

temperature control means including a temperature sensor responsive to the temperature of the fluid at the inlet of said diverter valve for proportioning the fluid flow between said first and second diverter valve outlets in response to the temperature of the fluid entering the diverter valve inlet, said valve diverting proportionately more fluid to the first valve outlet as the temperature of the incoming fluid drops and vice versa.

circulating means for circulating the fluid through said conduits, tank, first heat exchanger flow path and diverter valve;

temperature responsive means including temperature sensing means responsive to the temperature at the outlet of said first flow path for controlling the operation of the circulating means in response to the temperature of the fluid at the outlet of the first flow path;

the inlet of said second heat exchanger flow path being connected to the return side of a heat utilization device employing a fluid heat transfer agent, and the outlet of said second flow path being connected to the supply side of the heat utilization device.

15. The heating system of claim 14 wherein the heat storage mass and heat transfer fluid are water and the circulating means is a liquid pump.

16. The heating system of claim 15 wherein the exchanger first and second fluid flow paths are the shell and tubes respectively of a shell/tube heat exchanger.

* * * * *